United States Patent [19]

Nakagawa

[11] 3,822,889

[45] July 9, 1974

[54] AUTOMATIC RECORD PLAYER

[75] Inventor: Takamichi Nakagawa, Osaka, Japan

[73] Assignee: Matsushita Electric Industrial Co., Ltd., Osaka, Japan

[22] Filed: Sept. 5, 1972

[21] Appl. No.: 286,052

[30] Foreign Application Priority Data

| | | |
|---|---|---|
| Sept. 6, 1971 | Japan | 46-69109 |
| Sept. 6, 1971 | Japan | 46-81505 |
| Sept. 6, 1971 | Japan | 46-81506 |
| Sept. 6, 1971 | Japan | 46-81507 |
| Sept. 6, 1971 | Japan | 46-81508 |
| Sept. 6, 1971 | Japan | 46-81509 |
| Sept. 6, 1971 | Japan | 46-81510 |
| Sept. 6, 1971 | Japan | 46-84168 |

[52] U.S. Cl. .......... 274/10 R
[51] Int. Cl. .......... G11b 17/08
[58] Field of Search .......... 274/10 R, 9 R

[56] References Cited

UNITED STATES PATENTS 3,545,767 12/1970 Tourtellot .......... 274/10 R
3,697,087 10/1972 Takahashi .......... 274/10 R

*Primary Examiner*—William D. Martin, Jr.
*Assistant Examiner*—Steven L. Stephan
*Attorney, Agent, or Firm*—Wenderoth, Lind & Ponack

[57] ABSTRACT

An automatic record player of simplified construction which comprises a tone arm, a turntable, a turntable drive system, a switching knob for causing the tone arm to be brought in position to perform a record to be played and for intermitting the operation of the tone arm, a record size setting unit including a record size selector knob for positioning the tone arm at a predetermined position immediately above the lead-in groove of the record to be played, and a switch mounting plate rigidly mounted with a switch. The automatic record player with the above construction can be also used as a semi-automatic one and can be operated not only by operating the switching knob, but also by manually moving the tone arm to the predetermined position.

12 Claims, 16 Drawing Figures

AUTOMATIC RECORD PLAYER

Figure 1:
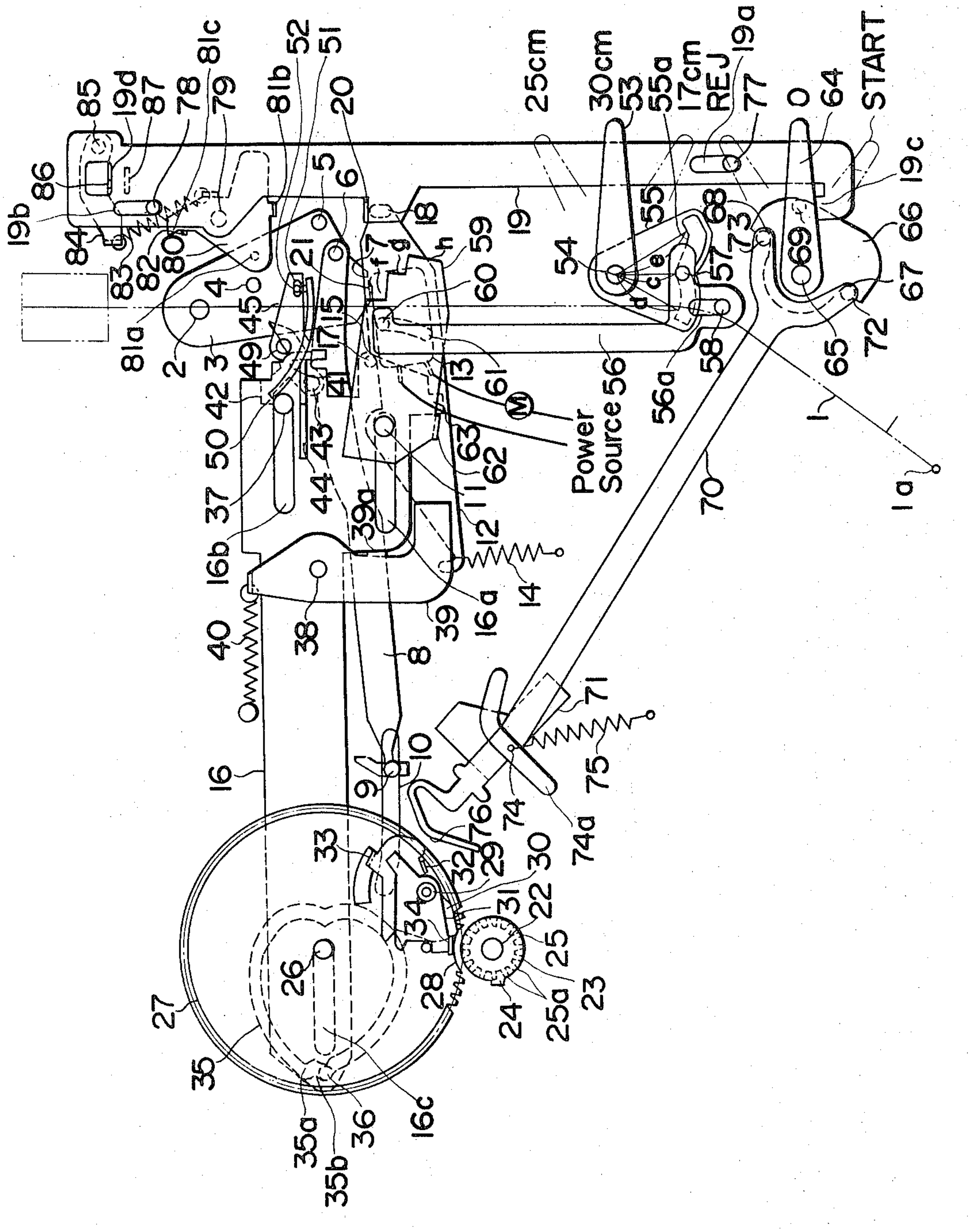

The present invention relates to an automatic record player.

Various record players, either semiautomatic or automatic, have been heretofore largely utilized and these may be generally classified into two groups. The first is the semiautomatic type wherein a tone arm is manually operated in such a manner that, if the tone arm is brought from its resting position to a position above the lead-in groove of a record to be played, a turntable carrying the record thereon commences to rotate and, when the tone arm reaches the lead-out groove of the record, it can be automatically returned to its rest position. The other is the automatic type wherein a record auto-changer is provided for enabling the record player to play a plurality of records in succession.

The record player of the first mentioned type is particularly used by those who enjoy records. However, they recognize the inconvenience in manually bringing the tone arm to the position immediately above the lead-in groove of the record to be played and so do children who try to operate the record player.

Those who often play the records and who happen to buy the record player of the second mentioned type often use their own record player in a semiautomatic manner. In other words, a record changer spindle outwardly extending through the center of the turntable and capable of carrying a plurality of records to be successively played is oftentimes replaced by an ordinary spindle which is not capable of carrying the records to be successively played, but only one.

In either case, the choice of the record player is limited by the preference of those who intend to buy or use it.

In addition, in the automatic record player of the second mentioned type, various mechanisms are provided for successively dropping the records on to the turntable each time one record has been played out and for detecting completion of performance of the records by means of a record stabilizer depressing the stacked records from above. The provision of these various mechanisms lead to a complicated structure of the record player and hence to increased manufacturing costs.

Accordingly, one essential object of the present invention is to provide an automatic record player which can be also used as a semi-automatic one with substantial elimination of the various inconveniences inherent in the conventional record player.

Another important object of the present invention is to provide an automatic record player of the above described type wherein various internal mechanisms for operating the tone arm are each simplified to provide an automatic record player which is commercially available at a reduced price.

A further object of the present invention is to provide an automatic record player of the above described type wherein means is provided for reducing or substantially eliminating a shock which may be otherwise generated upon collision of movable elements against stationary elements employed in the automatic record player.

Figures 2, 5:
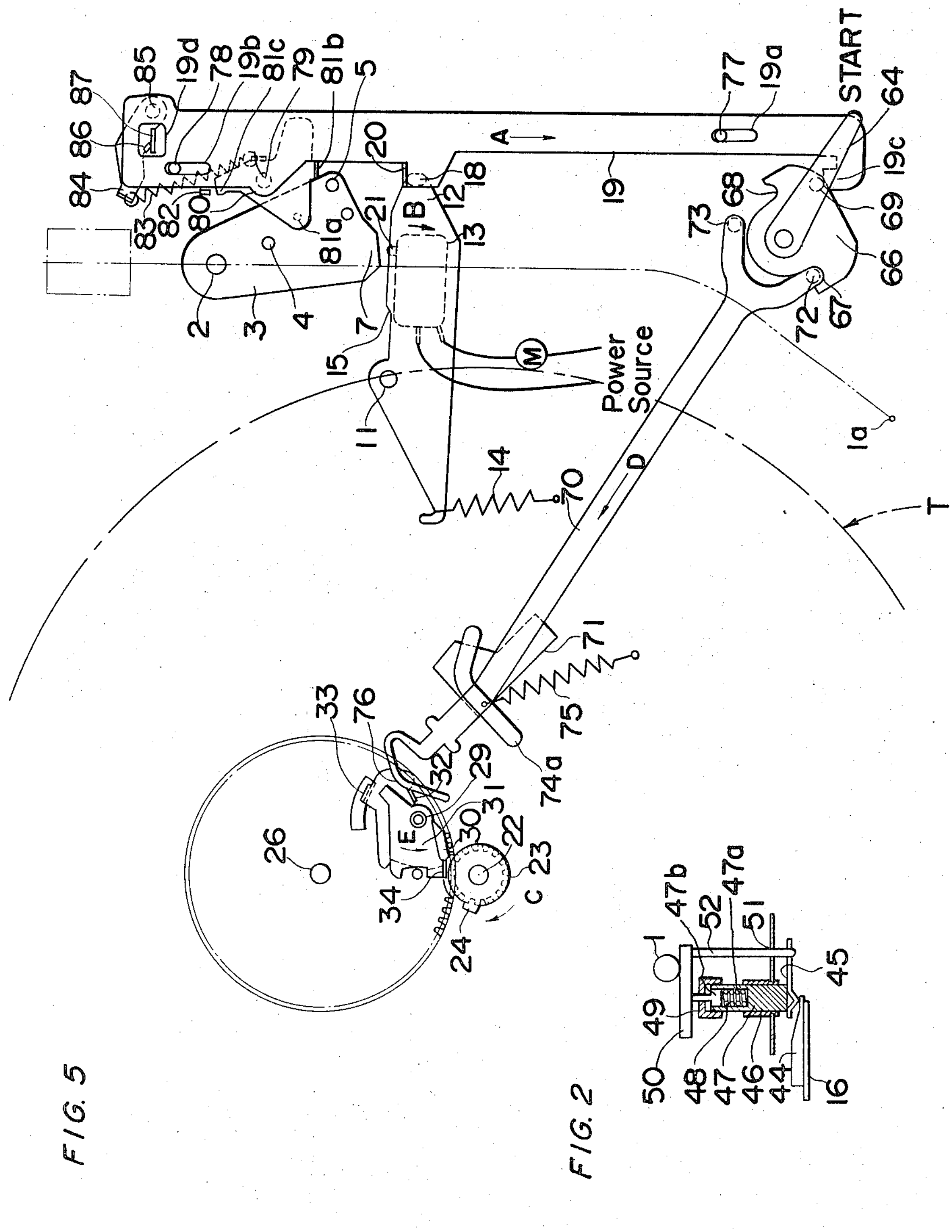
Figures 3, 6:
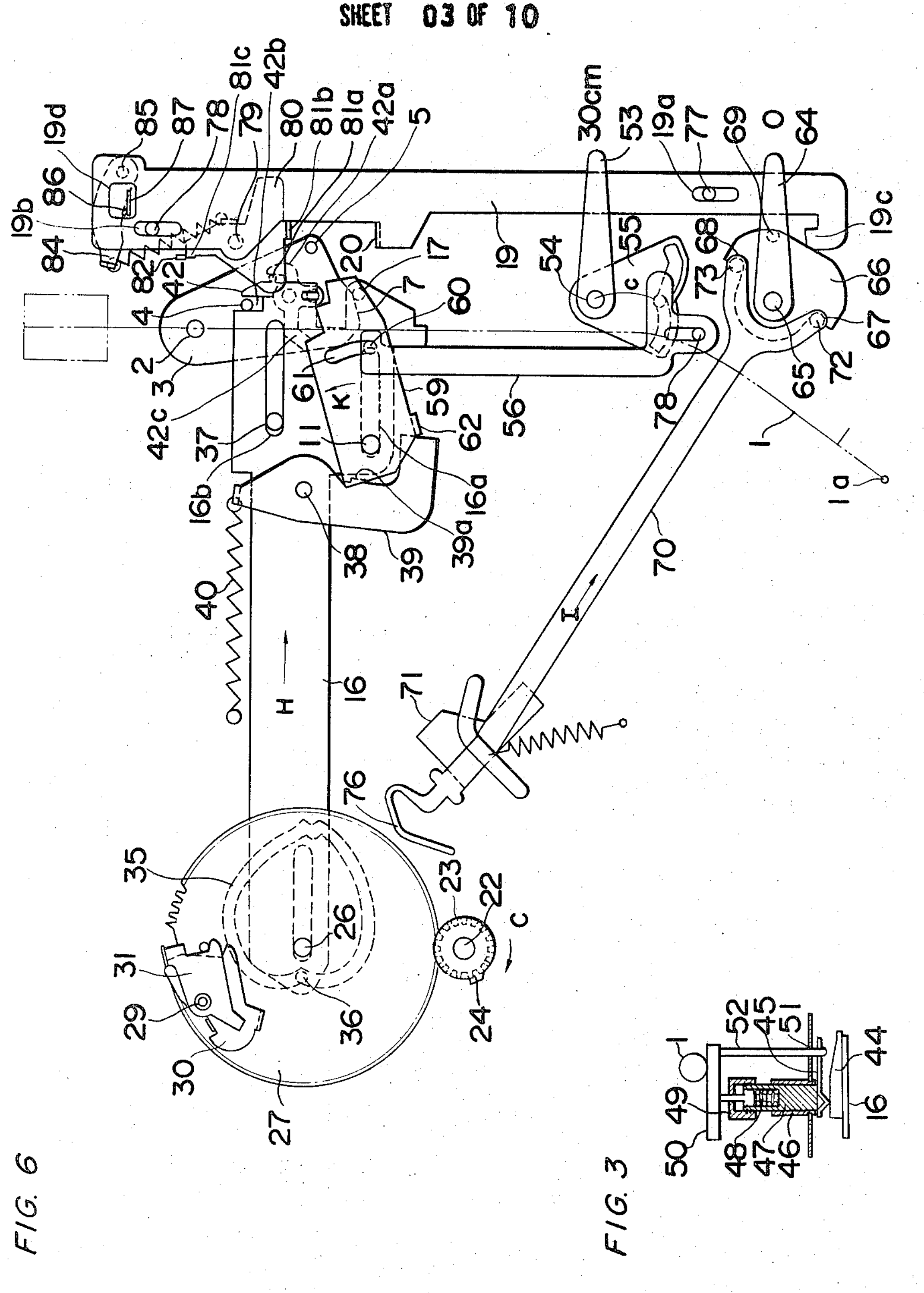
Figures 4, 7:
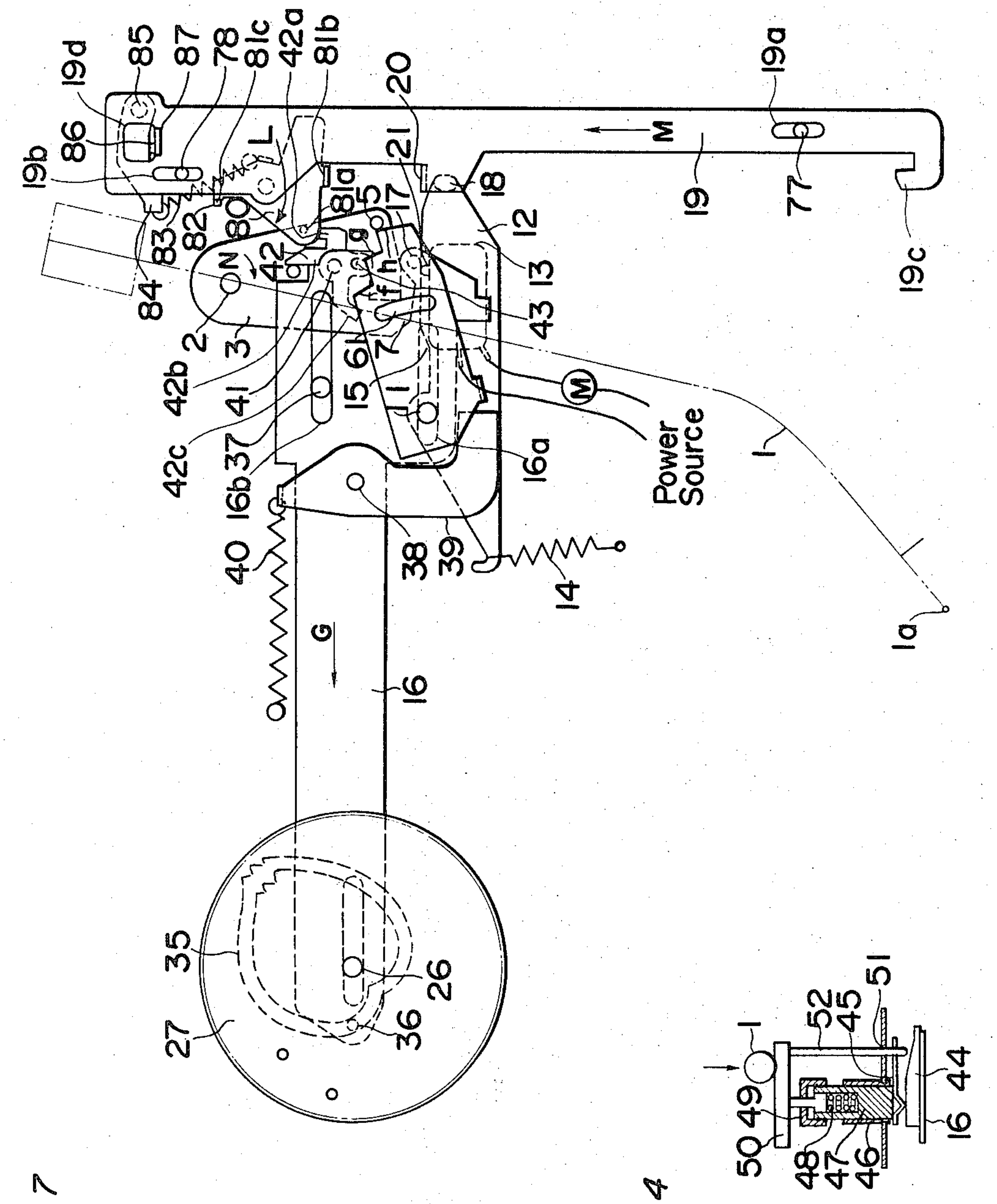
Figures 12, 13:
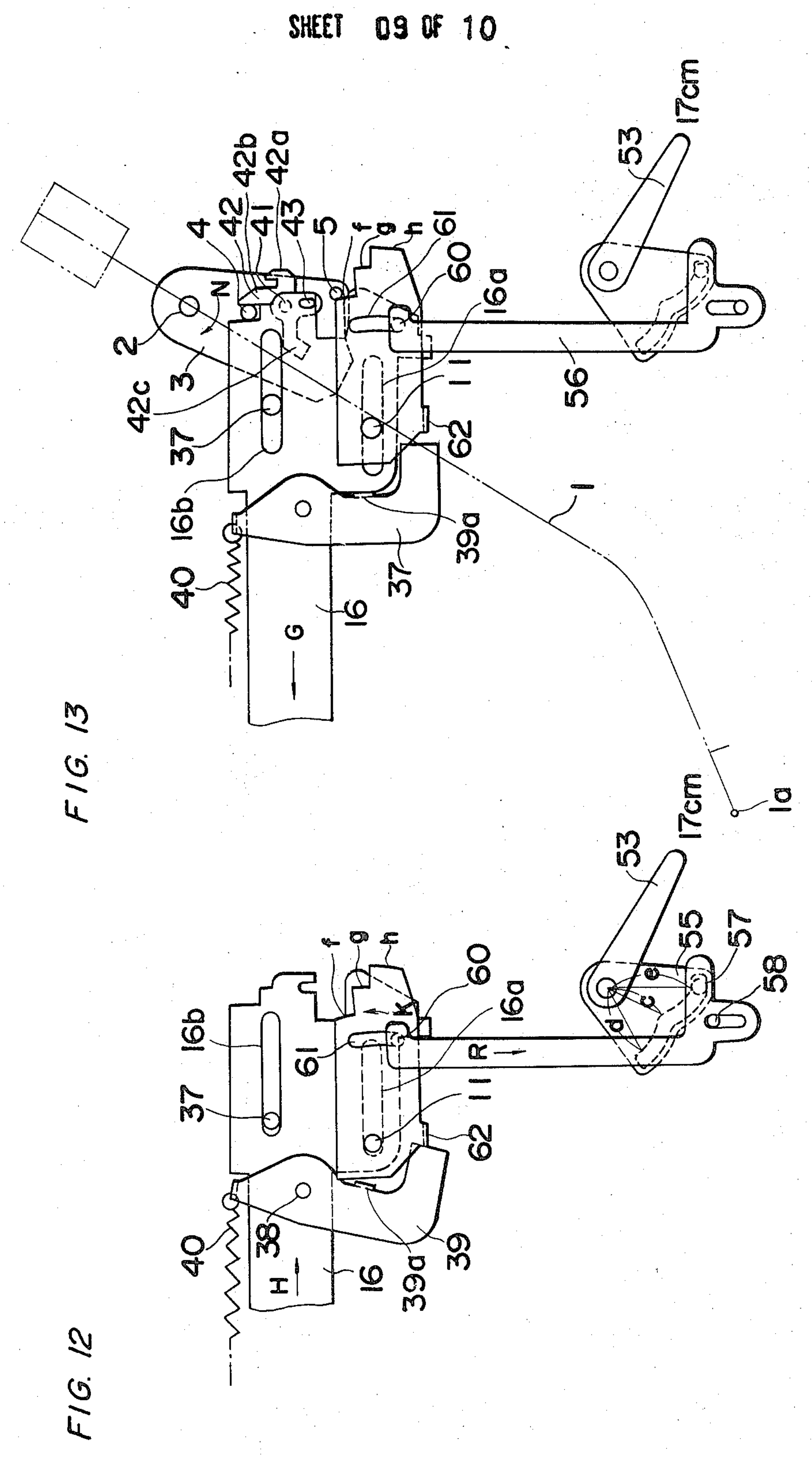
Figure 14:
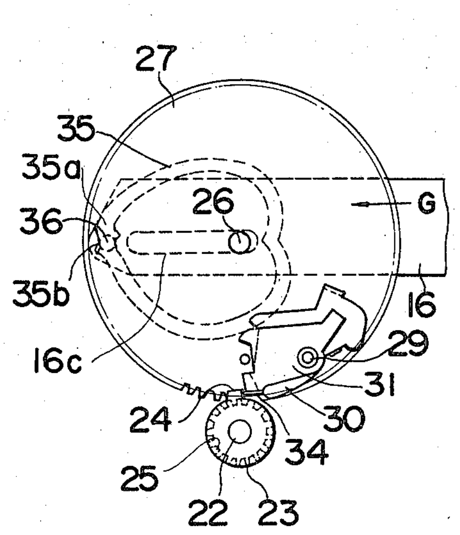
Figure 15:
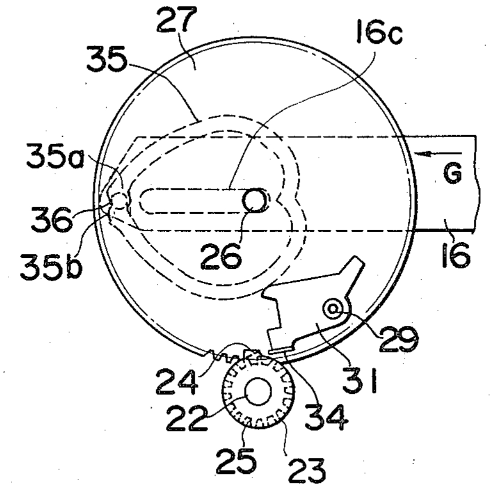
Figure 16:
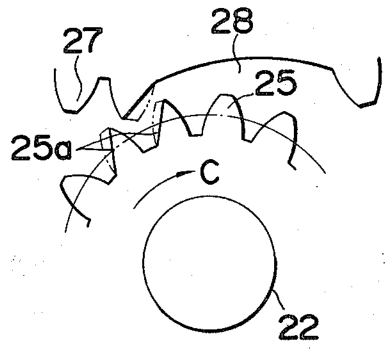

These and other objects and features of the present invention will become apparent from the following description taken in conjunction with a preferred embodiment thereof with reference to the accompanying drawings, in which:

FIG. 1 is a schematic top plan view of an automatic record player embodying the present invention with a mounting panel removed, FIGS. 2 to 4 are schematic side sectional views of a tone arm lifting rod employed in the record player of the present invention, showing sequential steps of operation thereof, FIGS. 5 to 11 are similar views to FIG. 1, but showing sequential steps of operation of the record player of the present invention, FIGS. 12 and 13 are similar views to FIG. 1, but showing an essential portion of a record size setting unit conditioned in sequential steps of operation thereof, FIG. 14 is a schematic top plan view of a geared wheel showing a manner of engagement between a lateral projection of a hollow stud and an operating member, FIG. 15 is a similar view to FIG. 14, but showing a manner of disengagement between the lateral projection and the operating member, and FIG. 16 is a schematic top plan view of a geared wheel and a geared portion of a hollow stud on an enlarged scale for showing the teeth-to-teeth relation.

Before the description of the present invention proceeds, it is to be noted that like parts are designated by like reference numerals throughout the accompanying drawings.

The automatic record player embodying the present invention includes a tone arm, schematically illustrated and indicated by 1, having a pickup stylus 1*a* at the front end thereof and having an end portion adjacent to the rear end thereof mounted on a spindle 2 above a mounting panel (not shown) for rotation thereabout together with said spindle 2 between a resting position and a play-out position. The spindle 2 has a lower end situated below the mounting panel and rigidly mounted with a shaped pivotable plate 3 carrying thereon upwardly extending return and start pins 4 and 5 and a downwardly extending mounting pin 6. This shaped pivotable plate 3 is formed with a cam edge as at 7 and is operatively associated with an actuator lever 8 in such a manner that a corresponding end of said actuator lever 8 is pivotally connected with said mounting pin 6 for reciprocatively moving said actuator lever 8 in accordance with the rotation of the pivotable plate 3, the other end of said actuator lever 8 being integrally formed or rigidly connected to a substantially T-shaped actuator piece 9 which extends upwardly through a slot 10 formed in the mounting panel for guiding the movement of said actuator piece 9 and hence said actuator lever 8.

Disposed in the vicinity of the shaped pivotable plate 3 is a switch mounting plate 12 pivotally carried by a stud 11 which extends downwardly from the undersurface of the mounting panel. This switch mounting plate 12 is formed with a cam edge 15 in one of the opposite sides of said plate 12 and an engagement protrusion 18 and is normally biased about the axis of the stud 11 by a tension spring 14 such that the cam edge 15 abuts against a pin 17, integrally downwardly extending from a drive plate 16, and said engagement protrusion 18 is engageable with a bent portion 20 of a slider 19 as will be described later.

The switch mounting plate 12 carries a microswitch 13 rigidly secured to the undersurface of said plate 12 and having a normally projected switch button 21 engageable with the cam edge 7 of the pivotable plate 3. This microswitch 13 is electrically connected in series with a motor M adapted to rotate a turntable (not shown), situated above the mounting panel, in any known manner through a conventional belt drive system or a conventional idler wheel drive system. The motor M can be operated when said button 21 is retracted in engagement with the cam edge 7 of the pivotable plate 3, and brought to an inoperative position when said button 21 is projected clear of the engagement with the cam edge 7.

The turntable T for carrying a record to be played is mounted on a mounting spindle 22 having an upper end portion upwardly extending through a center hole formed in the turntable and a lower end portion rotatably journalled by the mounting panel or a bearing device secured to the undersurface of the mounting panel. A portion of the mounting spindle 22 which is positioned between the undersurface of the turntable and the upper surface of the mounting panel is rigidly mounted or integrally formed with a hollow stud 23 in alignment with the longitudinal axis of said mounting spindle 22 and having an upper end formed with a lateral projection 24 and the lower end formed with a geared portion 25 consisting of a plurality of teeth. As clearly shown in FIG. 16, two of the teeth of said geared portion 25 which are positioned substantially below the lateral projection 24 have one of the opposed tooth surfaces, which faces counter to the rotational direction of the hollow stud 22 and hence the turntable as indicated by the arrow C, made flat as indicated by **25*a***.

Disposed in the vicinity of the hollow stud 23 rigidly mounted on the turntable carrying spindle 22 is a gear wheel 27 rotatably mounted on a shaft 26 fixed in turn to the upper surface of the mounting panel. This gear wheel 27 has a toothless portion or notch 28 formed in the peripheral edge thereof and carries an upright pin 29 extending from the upper surface of said geared wheel 27. The geared wheel 27 is provided with an operating member 31 pivotally mounted on its upper surface on said upright pin 29 and formed with an upwardly projecting piece 34 situated substantially above said notch 28 and engageable with the lateral projection 24 of the hollow stud 23, and also provided with an actuating plate 30 pivotally mounted on said upright pin 29 below said operating member 31 and formed with a pair of respectively downwardly and upwardly bent pieces 32 and 33, said downwardly bent piece 32 which is extended through a curved slot **27*a* formed in the geared wheel 27 and terminating at the path of travel of said T-shaped actuator piece 9 of the actuator lever 8 such as to be engageable with said T-shaped actuator piece 9. Preferably, a slight friction is imparted between the operating member 31 and the actuating plate 30 so that, as said actuating plate 30 is pivoted as will be mentioned later, the operating member 31 can be correspondingly pivoted to cause the projecting piece 34 to be positioned on the path of travel of the lateral projection 24**.

The geared wheel 27 is formed on its undersurface with a substantially heart-shaped groove 35 in which a pin 36 integrally upwardly extending from the drive plate 16 is slidably engaged, whereby as said geared wheel 27 is rotated, said drive plate 16 undergoes a camming motion with said pin 36 sliding along the groove 35. More specifically, the drive plate 16 is formed at one end portion with a pair of parallel slots **16*a* and 16*b* through which the stud 11 and a pin 37 downwardly extending from the undersurface of the mounting panel are respectively extended and at the other end portion with the pin 36 and a slot 16*c* through which the shaft 26 mounted with the geared wheel 27 is loosely extended. It is to be noted that these elements 11, 26 and 37 not only pass through the respective slots 16*a*, 16*c* and 16*b*, but also support the drive plate 16** in a movably suspended manner. This is possible, although not shown, by the use of ring washers each of which has a diameter greater than the width of corresponding one of these slots.

From the foregoing, it is clear that, as the geared wheel 27 is rotated and the groove 35 moves eccentrically with respect to the axis of the shaft 26 together with the geared wheel 27 rotating about the axis of said shaft 26, the drive plate 16 can be reciprocatively moved with the pin 36 slidably guided along the groove 35.

However, attention is called to the fact that the groove 35 is provided with a substantially W-shaped portion as shown at **35*a* forming a hill 35*b*. This W-shaped portion 35*a* facilitates a smooth engagement between the geared portion 25 of the hollow stud 23 and the geared wheel 27 and, at the same time, a quick release of the engagement between the lateral projection 24 and the projecting piece 34 of the operating member 31, thus reducing the load which may otherwise be imposed on the geared wheel 27 upon commencement of its rotation accompanied by the rotation of the hollow stud 23 and hence the turntable. An advantage of the provision of the W-shaped portion 35*a* in the groove 35** will become apparent later.

The drive plate 16 carries a presser plate 39 pivotally connected with a substantially intermediate portion of said drive plate 16 by means of a connecting member 38 and formed with a downwardly extending stopper **39*a*. This presser plate 39 is normally biased about the axis of said connecting member 38 by a tension spring 40 interposed between one end of said plate 39 and the undersurface of the mounting panel so that the downwardly extending stopper 39*a* abuts against the drive plate 16 adjacent to the slot 16*a*. The tension spring 40 concurrently acts on the drive plate 16 through the presser plate 39 so as to urge said drive plate 16 in a leftward direction with the stopper 39*a* restricted by said drive plate 16** in the manner as hereinabove described.

Figure 8:
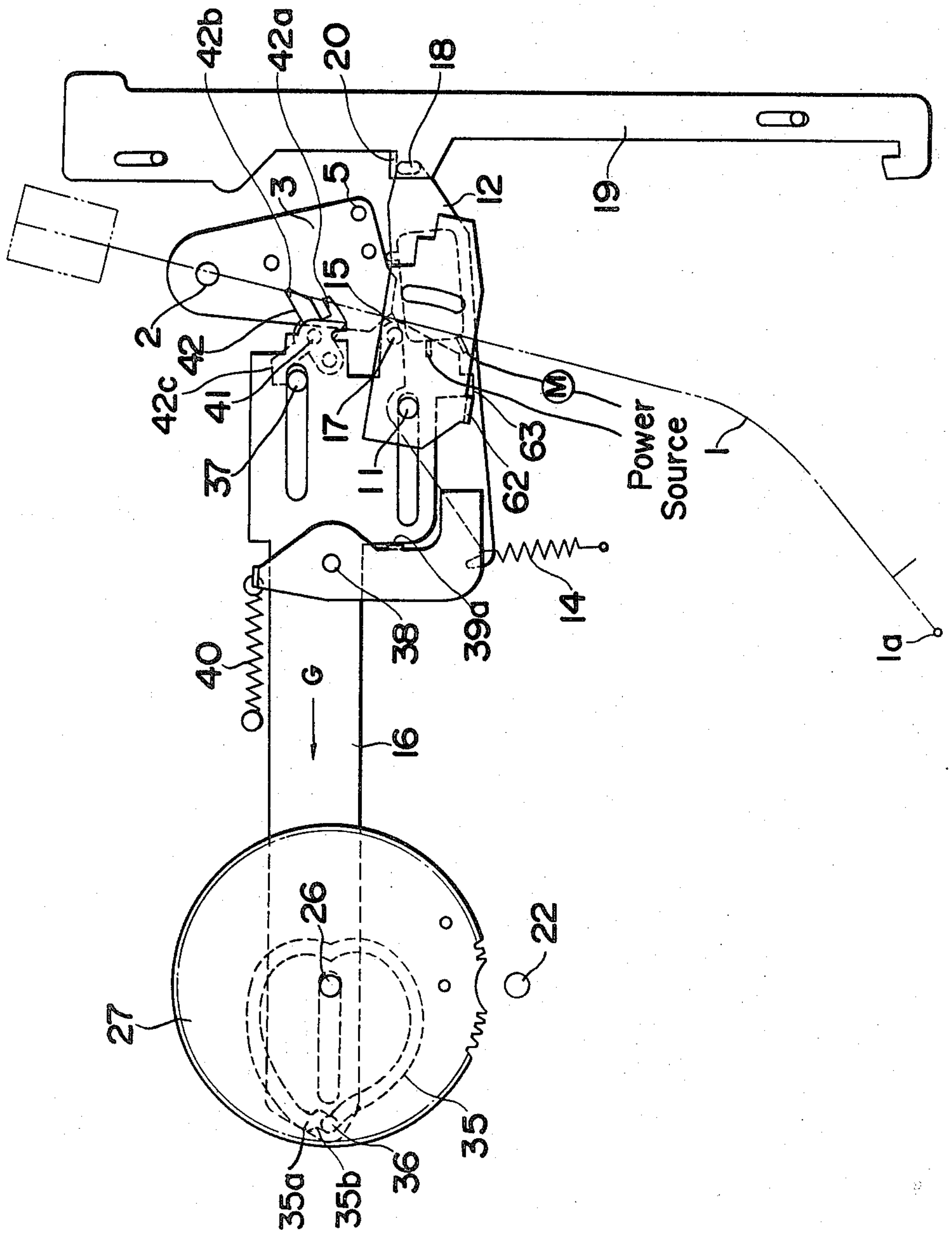
Figure 11:
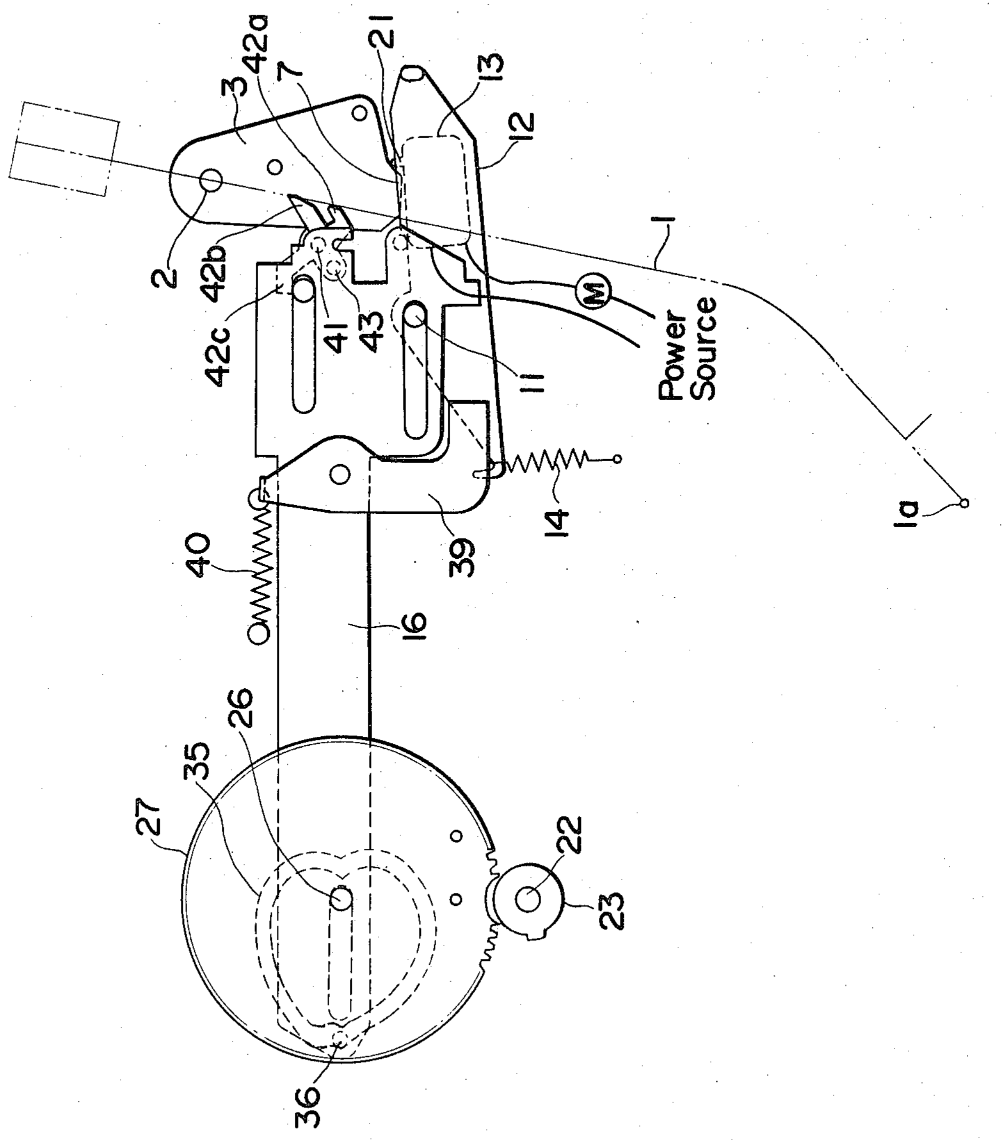

Mounted on the drive plate 16 located at a position between it and an intermediate portion of the pivotable plate 3 is an escapement wheel 42 having three arms **42*a*, 42*b* and 42*c* substantially radially outwardly extending therefrom. This escapament wheel 42 is rotatably mounted on said drive plate 16 by means of a shaft 41 and carries therein a detent ball 43 which is in turn slidably engaged with the drive plate 16 whereby said escapement wheel 42 can be pivoted between an engagement position and a release position. This escapament wheel 42 is, so long as the drive plate 16 is moved to the left by the action of the tension spring 40 as shown in FIGS. 1, 8 and 11, maintained in the release position in which condition the arm 42*c* of said escapement wheel 42 abuts against the portion of the pin 37 which downwardly extends through the slot 16b of the drive plate 16**.

Referring now to FIGS. 2 to 4, a tone arm lifting and descending mechanism is clearly shown. The tone arm lifting and descending mechanism comprises an upwardly projected cam member 44 rigidly mounted on or integrally formed with the upper surface of the drive plate 16 at a position adjacent to and on the opposite side of the escapement wheel 42, and a lifting rod 47 which rotatably extends through a sleeve 46 having a lower end rigidly mounted on the mounting panel. The lifting rod 47 has a lower end slidably engageable with said cam member 44 so that, as said drive plate 16 carrying thereon said cam member 44 moves to the right in accordance with a first half cycle of rotation of the geared wheel 27, said lifting rod 47 can be upwardly shifted and, on the other hand, as said drive plate 16 moves to the left in accordance with the rotation of the geared wheel 27 during the other half cycle, said lifting rod 47 can be downwardly shifted.

The other upper end of said lifting rod 47 which outwardly projects from an upper end of the sleeve 46 is formed with a blind hole 47*a* extending in alignment with the longitudinal axis of said lifting rod 47, the outer peripheral surface of said upper end of said lifting rod 47 being threaded to adjustably receive an adjustment cap 49. A lifting piece 47*b* having a lower end situated within the blind hole 47*a* and the other upper end rigidly or integrally formed with a horizontally extending arcuate stay 50 above the mounting panel is normally upwardly urged by a compression spring 48 interposed between the lower end face of said lifting piece 47*b* and the depth of said blind hole 47*a*. From the foregoing, it is clear that the adjustment cap 49 is adapted to adjust the lifting height of the tone arm 1 while the compression spring 48 acts to absorb a shock which may be otherwise produced upon engagement of the stay 50 with the tone arm 1 as the lifting rod 47 is upwardly shifted with its lower end slidably engaged with the cam member 44 on the drive plate 16. Furthermore, it is also clear that, since the adjustment cap 49 is threadably mounted on the upper end of the lifting rod 47, a fine adjustment of the lifting height can be advantageously carried out by turning it in either direction. The stay 50 has one end provided with an elongated pin 52 which downwardly extends loosely through a hole 51 formed in the mounting panel for preventing the stay 52 from possibly rotating about the axis of said lifting rod 47.

In the automatic record player as shown, a record size setting unit is provided and is manually operable. With reference to FIGS. 1, 6, 12 and 13, the record size setting unit comprises a record size selector knob 53 pivotable about a shaft 54 having an upper end rigidly connected with said selector knob 53 above the mounting panel and the other lower end rigidly mounted with a cam plate 55 of a shape as will be described later. This record size selector knob 53 is intermittently rotatable among "17", "30" and "25" positions, which represent the diameters of three kinds of commercially available records, respectively, by means of a suitable detent mechanism (not shown) preferably provided in the cam plate 55. Nevertheless, this selector knob 53 is manually rotated to a selected one of the three detent positions depending upon the diameter of a record to be played.

The cam plate 55 is of a segmental shape and a substantially W-shaped slot 55*a* is formed therein and extends along the arcuate edge of said cam plate 55. It is to be noted that the distance between the axis of the shaft 54 and any one of three portions, i.e., righthand, intermediate and left-hand portions, of the substantially W-shaped slot 55*a* varys in such a way that the distance *c* between the axis of said shaft 54 and the intermediate portion of the slot 55*a* is the smallest of all the distances *c*, *d* and *e* between the shaft axis and the left-hand portion of the slot 55*a* and between the shaft axis and the right-hand portion of the slot 55*a*, the distance *e* being the greatest of all the distances *c*, *d*, and *e*. It is to be noted that the right-hand, intermediate and left-hand portions of the slot 55*a* are respectively associated with the 17, 30 and 25 positions of the record size selector knob 53.

The record size setting unit further comprises a positioning lever 56 having one end formed with a downwardly extending boss 57 slidably engaged in the slot 55*a* of the cam plate 55 and a slot 56*a* adjacent to said boss 57, said slot 56*a* extending in parallel to the direction of movement of said positioning lever 56 and a support pin 58 downwardly extends from the undersurface of the mounting panel there through for slidably supporting said positioning lever 56. The other end of said positioning lever 56 is formed with a downwardly extending projection 60 which is slidably engaged in an arcuate slot 61 formed in a positioning plate 59 which is independently rotatably carried by the stud 11. The positioning plate 59 is provided with three stepped edges as shown at *f*, *g* and *h* which are respectively associated with the commercially available records having the aforementioned 17cm., 25cm., and 30cm. diameters and engageable with the start pin 5 on the pivotable plate 3 for defining the angle of rotation of the tone arm 1 through which said tone arm 1 is rotated from its resting position to another predetermined position to cause the pickup stylus 1a of said tone arm 1 to be positioned above the lead-in groove of a record of preselected diameter. By way of example, if the positioning plate 59 is, in such a manner as will be mentioned later, conditioned such that the stepped edge *f* of the plate 59 is ready to engage with the start pin 5, the pickup stylus 1*a* will be positioned immediately above the lead-in groove of a record of 30cm. diameter at the time said start pin 5 abuts against the stepped edge *f* of the plate 59. This is possible due to the rotation of the pivotable plate 3 which takes place when the return pin 4 on the pivotable plate 3 is trapped in between the adjacent arms 42*a* and 42*b* of the escapement wheel 42 while the drive plate 16 carrying said escapement wheel 42 moves to the leftward direction.

The positioning plate 59 is also formed with a bent edge 62 at a position adjacent to the stud 11 which is engageable with the free end of the presser plate 39 from one side and, from the other side, with a protrusion 63 laterally extending from the drive plate 16.

In the arrangement as hereinabove described, as the drive plate 16 moves to the right, the free end of the presser plate 39 carried by the drive plate 16 abuts against the bent edge 62 of the positioning plate 59 causing the latter to rotate about the stud 11 until one of the stepped edges *f*, *g* and *h* of said plate 59, which is preselected by setting the record size selector knob 53 to the desired one of the three detent positions, i.e., 17, 30 and 25 positions, is brought to a position where it is ready to engage with the start pin 5. Subsequently, as the drive plate 16 moves to the left accompanying the corresponding rotation of the pivotable plate 3 and hence the tone arm 1 in the manner as hereinabove described, the start pin 5 abuts against the selected stepped edge of the positioning plate 59, in which condition the pickup stylus 1*a* is positioned immediately above the lead-in groove of the record of predetermined diameter. As the drive plate 16 is further moved in the leftward direction, the protrusion 63 of the drive plate 16 abuts against the bent edge 62 of the positioning plate 59 from the other side, thus causing the positioning plate 59 to rotate in the opposite direction thereby clearing the selected stepped edge of said plate 59 from the path of travel of said start pin 5 and permitting the pivotable plate 3 and hence the tone arm 1 to freely rotate about the spindle 2.

The automatic record player is also provided with an ON-OFF control for starting the performance of a record and also for intermitting the performance thereof. This ON-OFF control includes a triggering knob 64 situated above the mounting panel and a segment 66 situated below said mounting panel, both of which are rigidly connected together for rotation by a connecting pin 65 which rotatably extends through the mounting panel. The segment 66 is formed with a pair of abutments as shown at 67 and 68 and also with a projection 69 extending perpendicular to the plane of said segment 66.

Extending between the geared wheel 27 and said segment 66 is an operating lever 70 having one end formed into a substantially Y-shape and formed with a pair of projections 72 and 73 abutting the abutments 67 and 68, respectively, of the segment 66, and the other end situated above the mounting panel and integrally formed with a curved finger 76 engageable with the upright projection 32 formed in the actuating plate 30. For preventing an arbitrary movement of said operating lever 70, the operating lever 70 is provided at an end portion adjacent to the curved finger 76 with a retainer 74*a* transversely extending with respect to the direction of movement of said lever 70 and situated below the mounting panel and loosely sandwiched between said lever 70 and said retainer 70*a*. A connected leg (not shown) connecting between said lever 70 and the retainer 70*a* extends through an opening 71 formed in the mounting panel. A tension spring 75 interposed between the mounting panel and the retainer 74*a* (or the operating lever 70) acts to urge the operating lever 70 in one predetermined direction so as to cause the projections 72 and 73 of the Y-shaped end of said operating lever 70 to constantly engage the abutments 67 and 68, respectively, while forming a space between the curved finger 76 and the upright projection 32 of the actuating plate 30. In this condition, the connecting leg for connecting between said lever 70 and said retainer 70*a* is in contact with a straight edge of the opening 71 of the mounting panel so that the operating lever 70 can be moved in a straight line as the triggering knob 64 is operated.

In FIGS. 1 and 6, the triggering knob 64 is shown as positioned at a neutral position in which condition the curved finger 76 of the operating lever 70 is separated from the upright projection 32 of the actuating plate 30. The triggering knob 64 is manually rotatable from the neutral position to either of the START and REJECTION positions located on both sides of said neutral position. These projections are designated in the drawings by REJ, START and 0. It is to be noted that the tension spring 75 must have a sufficient resiliency to cause the segment 66 and hence the triggering knob 64 to return to the neutral position readily and automatically after said knob 64 has been rotated to any one of the START and REJ positions.

The ON-OFF control further includes the slider 19 situated below the mounting panel and formed with a pair of spaced slots 19*a* and 19*b* through which respective pins 77 and 78 extend and are secured to the undersurface of the mounting panel for suspending said slider 19 for movement in the lengthwise direction thereof. The slider 19 is also formed at one end with an engagement edge 19*c* engageable with a upright projection 69 formed in the segment 66 to that said slider 19 can be moved only when the triggering knob 64 and hence the segment 66 is rotated to the START position. This slider 19 is provided with the bent portion 20, as hereinbefore described, which is engageable with the engagement protrusion 18 formed in the switch mounting plate 12 and, because of this, the movement of the slider 19 in the direction as indicated by the arrow A in FIG. 5 which is effected by rotating the triggering knob 64 to the START position will cause the switch mounting plate 12 to pivot about the stud 11 in the direction as indicated by the arrow B in FIG. 5 thereby turning on the microswitch 13 whereby the switch button 21, which has been depressed by the cam edge 7 of the pivotable plate 3, can be outwardly projected.

At a portion of the slider 19 adjacent to the other end thereof, the slider 19 carries a locking plate 80 rotatably connected thereto by means of a pin 79. The locking plate 80 is of a substantially triangular shape and has one corner portion formed with a downwardly extending spindle 81*a* of a diameter slightly smaller than the size of a space or the distance between the adjacent two arms 42*a* and 42*b* of the escapement wheel 42. This locking plate 80 is also formed with a bent portion 81*b* normally engaged to the adjacent edge of the slider 19 and a detent portion 81*c*, the function of said bent portion 81*b* and said detent portion 81*c* being described below.

Figure 10:
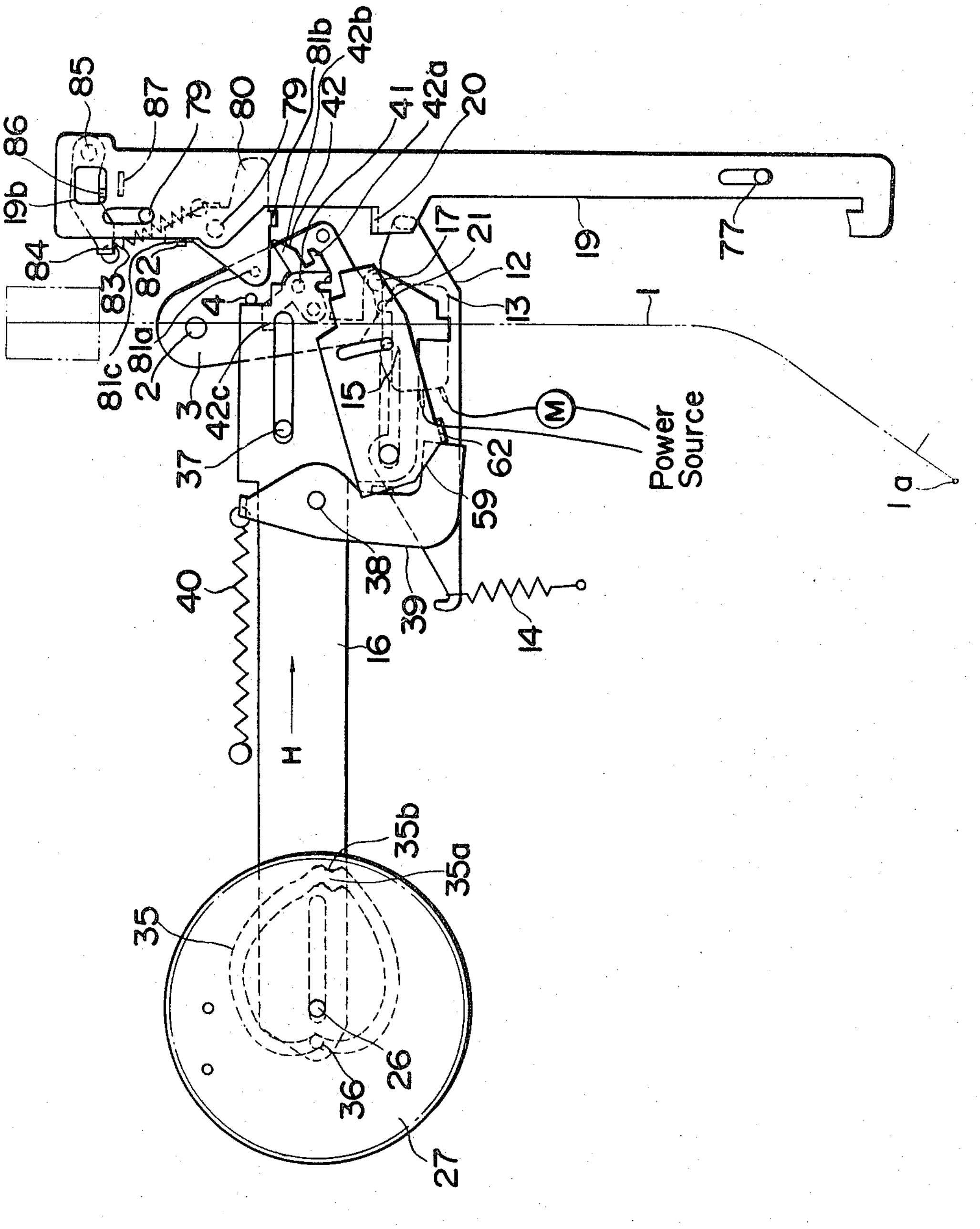

The other end of the slider 19 is formed with a substantially square-shaped opening 19*d* and, adjacent to said square-shaped opening 19*d*, carries a release plate 84 rotatably carried by the slider 19 by means of a pin 85 and formed at its substantially intermediate portion with an upwardly bent portion 86 which extends through said square-shaped opening 19*d*. A coil spring 83 has one end connected to a free end of the release plate 84 and the other end connected to the locking plate 80 whereby said release plate 84 is nromally biased about the pin 85 with said bent portion 86 abutted aginst one edge of the opening 19*d* close to the locking plate 80 and, on the other hand, said locking plate 80 is also biased about the pin 79 with the bent portion 81*b* close to the edge of the slider 19 as shown in FIGS. 1 and 10. As will be mentioned later, there must be a space between the bent portion 81*b* of said locking plate 80 and the adjacent edge of the slider 19.

A stopper 82 and a barrier 87, both of which may be of one-piece construction, are secured to the undersurface of the mounting panel and respectively positioned in the vicinity of the detent portion 81*c* of the locking plate 80 and in front of the bent portion 86 of the release plate 84. The stopper 82 and the barrier 87 act in cooperative relation to each other in such a way that, as the slider 19 is moved in the direction A (FIG. 5) upon rotation of the triggering knob 64 to the START position, the bent portion 86 of the release plate 84 is engaged by the barrier 87, thereby rotating about the pin 85 so as to expand the coil spring 83 and, at the same time, the detent portion 81*c* of the locking plate 80, which has tended to rotate about the pin 79 in the pulling direction of the expanded coil spring 83, passes through the stopper 82 with the result that the bent portion 81*b* of said locking plate 80 abuts against the edge of the slider 19. At the time the movement of the slider 19 in the direction A completes, the condition shown in FIG. 5 can be established. However, immediately after the triggering knob 64 has been released thereby to let said triggering knob 64 to return from the START position to the neutral or 0 position, the detent portion 81c is abutted against the stopper 82 whereby the slider 19 is stopped at a substantially intermediate point of the stroke of movement of said slider 19 after having returned, thus establishing the condition as shown in FIG. 6.

The engagement between the detent portion 81*c* and the stopper 82 can be released only when the spindle 81*a* on the locking plate is trapped between the adjacent arms 42*a* and 42*b* of the escapement wheel 42 and subsequently slightly pulled in the direction away from the slider 19 thereby permitting the detent portion 81*c* to slip over the stopper 82 as shown in FIG. 7. After the detent portion 81*c* has slipped over the stopper 82 the slider 19 is, of course, moved in the direction as indicated by the arrow M in FIG. 7 by the action of the coil spring 83 which is stretched to produce a pulling force, thus permitting the slider 19 to return its original position as shown in FIG 1.

The reason for engagement of the spindle 81*a* on the locking plate 80 into the space between the arms 42*a* and 42*b* of the escapement wheel 42 will now be described. Assuming that the drive plate 16 carrying the escapement wheel 42 is moving in the direction as indicated by the arrow H in FIG. 6 while said escapement wheel 42 is conditioned as shown in FIG. 1 and, at the same time, the locking plate 80 is in a locking position with the detent portion 81*c* engaged against the stopper 82 as shown in FIG. 6, one of the opposite sides of the arm 42*b* which faces the arm 42*a* is first slidably engaged with the spindle 81*a*. At this time, the bent portion 81*b* of the locking plate 80 abutts against the edge of the slider 19 and, therefore, the locking plate 80 does not undergo any motion even if a pushing force, which is of a smaller value than the force necessary to rotate said escapement wheel against the friction between the detent ball 43 and the drive plate 16, has been applied to the spindle 81*a*.

As the drive plate 16 is further moved to the right in the direction H, the escapement wheel 42 commences to rotate with the spindle 81*a* sliding along the side of the arm 42*b* until said spindle 81*a* is trapped in between the two adjacent arms 42*a* and 42*b* of the escapement wheel 42. Upon a return movement of the drive plate 16 to the left in the direction as indicated by G in FIG. 7, the tip of the arm 42*a* kicks the spindle 81*a* thus permitting the latter to escape from the space between said arms 42*a* and 42*b*. At this time, the locking plate 80 is rotated a certain angle in the direction as indicated by L in FIG. 7 whereby the engagement between the stopper 82 and the detent portion 81*c* of the locking plate 80 is released.

It is to be noted that the release plate 84 and its related elements such as indicated by 85, 86 and 87 may be omitted. In this case, instead of the coil spring 83, a tension spring must be disposed between the locking plate 80 and the undersurface of the mounting panel in a similar manner as said coil spring 83 is disposed. However, the employment of the release plate 84 and its associated elements, which is one of the essential features of the present invention, is advantageous in that a shock, which may be otherwise produced upon collision between movable elements and fixed elements in the case where a tension spring is employed instead of the coil spring 83, can be reduced or substantially eliminated. This advantage can be appreciated if the initial spring height of the coil spring 83 is selected as sbstantially equal to the distance between two individual points of the locking plate 80 and release plate 84, to which the both ends of said coil spring 83 are respectively connected, when said plates 80 and 84 are conditioned such as shown in FIG. 1.

The operation of the automatic record player embodying the present invention will be now described. It is first assumed that the tone arm 1 is in the resting position in which condition the tone arm 1 is positioned on a tone arm rest (not shown) provided on the mounting panel. This condition is illustrated in FIG. 1, wherein the microswitch 13 is turned off with the switch button 21 depressed by the cam edge 7 of the pivotable plate 3 and, therefore, the turntable T is not rotating. Furthermore, in this condition, the lifting rod 47 is in the downwardly shifted position with the cam member 44 on the drive plate 16 clear of the lower end of said lifting rod 47 substantially as shown in FIG 2.

After a record of predetermined diameter, for example, 30 cm., (correspondingly, the selector knob 53 has been set to the 30cm position.) has been mounted on the turntable and the triggering knob 64 has been rotated to the START position from the neutral or 0 position, the segment 66 is correspondingly rotated causing the operating lever 70 to move in the direction D against the tension spring 75 with the curved finger 76 abutting against the upright projection 32 of the actuating plate 30 so that the plate 30 and the operating member 31 frictionally engaged with the plate 30 are both rotated in the direction E until the projecting piece 34 is positioned in the path of travel of the lateral projection 24 which is rotatable together with the turntable, substantially as shown in FIG. 5.

On the other hand, as the triggering knob 64 is rotated to the START position as hereinbefore described, the upright projection 69 formed on the segment 66 engages with the edge 19*c* of the slider 19 thereby permitting the slider 19 to move in the direction A as shown in FIG. 5. Upon the movement of the slider 19 in the direction A, the switch mounting plate 12 is rotated in the direction B by the engagement between the protrusion 18 of said plate 12 and the bent portion 20 of said slider 19 whereby the microswitch 13 can be turned on with the switch button 21 clear of the cam edge 7 of the pivotable plate 3, thus permitting the motor M to operate to rotate the turntable.

It is to be noted that, during the movement of said slider 19 in the direction A, the coil spring 83 is stretched. The bent portion 86 of the release plate 84 engages the barrier 87 so that, after the detent portion 81c of the locking plate 80 has been passed through the stopper 82, the locking plate 80 is rotated by the expanded coil spring 83 until the bent portion 81b thereof abuts against the edge of the slider 19. At the same time, the slider 19 tends to move in the opposite direction M by means of said expanded coil spring 83 and, therefore, said slider 19 after being moved in the direction A automatically begins to return to its original position. During this return movement of the slider 19, however, the detent portion 81c of the locking plate 80 that has been passed through the stopper 82 engages with the stopper 82 whereby the slider 19 is stopped at a substantially intermediate point of the stroke of movement of said slider 19 as hereinbefore described, the condition of which is illustrated in FIG. 6.

Rotation of the turntable by the motor M by means of a suitable power transmission, i.e., either a belt drive system or an idler wheel drive system, accompanies corresponding rotation of the stud 23. As said hollow stud 23, which may be integrally formed with the undersurface of the turntable, rotates, the lateral projection 24 on said stud 23 approaches to the projecting piece 34 of the operating member 31 which has been positioned in the path of travel of said lateral projection 24 as hereinbefore described, and finally said lateral projection 24 engages with said projecting piece 34 thereby permitting the geared wheel 27 to rotate in a direction counter to the rotational direction of the turntable.

At the time the engagement between the lateral projection 24 and the projecting piece 34 takes place, one of teeth of the geared wheel 27 enters the region between two teeth 25a of the geared portion 25 of the hollow stud 23 as shown in FIG. 16, whereby the geared wheel 27 can be thereafter rotated by the rotation of the hollow stud 23 and hence the turntable, while the engagement between said lateral projection 24 and said projecting piece 34 is at the same time released.

One rotation of the geared wheel 27 results in a reciprocal movement of the drive plate 16 by the reason as hereinbefore described. However, because of the provision of the substantially W-shaped portion 35a in the groove 35, which forms the hill 35b, the pin 36 on the drive plate 16 normally urged in one direction G (FIGS. 14 and 15) by the tension spring 40 slides over the hill 35b immediately after said geared wheel 27 has been rotated a slight angle about the shaft 26, thus reducing the resistance to the rotational force of the turntable during the engagement between said lateral projection 24 and said projecting piece 34. Disengagement between sand projection 24 and said piece 24 readily takes place immediately after said pin 36 has slid over the hill 35b and, therefore, no resistance to the rotational force of the turntable is encountered by the turntable.

Furthermore, the two teeth of the geared portion 25 having one tooth surface made flat as hereinbefore described, which receives therein the one tooth of the geared wheel 27 upon commencement of rotation of the geared wheel 27. Because of this, no improper engagement between the geared wheel portion 25 and the geared wheel 27 take place.

During half a cycle of rotation of the geared wheel 27, the drive plate 16 moves in the direction H (FIG. 6) against the tension spring 40 with the pin 36 slidably guided along the groove 35 and the lower end of the lifting rod 47 accordingly slides on to the top of the cam member 44 on said drive plate 16, thus permitting the tone arm 1 to be upwardly shifted clear of the tone arm rest. This condition is illustrated in FIGS. 3 and 6.

However, even after the lifting rod 47 has been upwardly shifted with the lower end of said rod 47 on the top of the cam member 44 in the manner as hereinabove described, the drive plate 16 continues to move in the direction H against the tension spring 40 and, during this further movement of said drive plate 16, the free end of the presser plate 39 abuts against the bent edge 62, thereby causing the positioning plate 59 to rotate in the direction K as shown in FIG. 6 until a preselected one of the stepped edges f, g and h, which is associated with the record of the 30cm. diameter, of the positioning plate 59 is brought into register with the path of travel of the start pin 5 on the pivotable plate 3.

The stroke of rotaton of the positioning plate 59 is limited by the size of the arcuate slot 61 which acts in cooperation with the projection 60 formed on the adjacent end of the positioning lever 56 and slidably extending through said arcuate slot 61. It is to be noted that, at the time the positioning plate 59 completes its rotation in the direction K through a predetermined angle defined by the slot 61 in cooperation with the projection 60, a gap is formed between the stopper 39a and the point of the drive plate 16 to which said stopper 39a has been engaged. This gap varies in size depending upon the position of the projection 60 which depends upon the setting of the record size selector knob 53.

At the same time as said positioning plate 59 has been thus rotated in the direction K, the escapement wheel 42 carried by the drive plate 16 becomes positioned to trap the spindle 81a of the locking plate 80 between the adjacent arms 42a and 42b in the manner as hereinbefore described. Upon completion of the first half cycle of rotation of the geared wheel 27, the spindle 81a of the locking plate 81 is engaged in the space between said adjacent arms 42a and 42b of the escapament wheel 42 substantially as shown in FIG. 6.

As the geared wheel 27 undergoes the remaining half cycle of rotation about the spindle 26 causing the drive plate 16 to move in the opposite direction G, the escapement wheel 42 is correspondingly moved so that disengagement between the detent portion 81c and the stopper 82 takes place in the manner as hereinbefore described. Upon this disengagement, the slider 19 is, of course, returned to its original position and the switch mounting plate 12 tends to rotate to its original position by the action of the tension spring 14.

However, since the pin 17 on the drive plate 16 has slid over the cam edge 7 in accordance with the movement of the drive plate 16 in the direction H, the rotation of the plate 12 to its original position is restricted by the pin 17 wherefor the switch button 21 is still maintained in a position clear of the cam edge 7 of the pivotable plate 3. Therefore, even if the slider 19 has been returned to the original position forming a space between the engagement protrusion 18 of the switch mounting plate 12 and the bent portion 20 of the slider 19, the switch button 21 is in the projected position with the microswitch 13 turned on to operate the motor M.

As the drive plate 16 further moves in the direction G, the pivotable plate 3 is rotated by the engagement between the return pin 4 and the arm 42b, the rotation of the pivotable plate 3 being subsequently restricted when the start pin 5 on the plate 3 engages the selected stepped edge *h* of the positioning plate 59 which has been brought into the path of travel of the start pin 5 by the setting of the record size selector knob 53, this condition being illustrated in FIG. 7.

Rotation of the pivotable plate 3 results in the corresponding rotation of the tone arm 1. In other words, at the time the start pin 5 on the pivotable plate 3 is restricted by the selected stepped edge h of the positioning plate 59, the pickup stylus 1*a* of the tone arm 1 has been brought immediately above the lead-in groove of the 30cm. diameter record to be played.

After the start pin 5 engages the selected stepped edge *h* of the positioning plate 59 which is guided by the arm 42*b* engaged with the return pin 4 and while the drive plate 16 carrying thereon said escapement wheel 42 continues its return movement in the direction G, the arm 42*b* encounters a resistance which acts to rotate the escapement wheel 42 and, therefore, the latter can be rotated to its original position against the friction exerted between the detent ball 43, collapsibly carried by the body of the escapement wheel 42, and the drive plate 16.

Subsequently, the lifting rod 47 descends with its lower end sliding down the cam member 44 on the drive plate 16, and the tone arm 1 which has been rotated through a predetermined angle, descends with the pickup stylus 1*a* engaged in the lead-in groove of the record to be played.

However, prior to completion of the descending movement of the lifting rod 47 and hence the tone arm 1, the protrusion 63 of the drive plate 16 engages the bent edge 62 of the positioning plate 59, causing the latter to rotate so as to permit the freedom of movement of the start pin 5 and hence rotation of the pivotable plate 3. Therefore, at the time the pickup stylus 1a of the tone arm 1 engages in the lead-in groove of the record to be played, the tone arm 1 has been already conditioned so as to freely rotate about the spindle 2. This condition is illustrated in FIG. 8.

Simultaneously therewith, the pin 17 on the drive plate 16 slides down the cam edge 7 of the switch mounting plate 12 and, therefore, the latter can be rotated about the stud 11 in the pulling direction of the tension spring 14 so as to bring the switch button 21 in its projected condition to a position ready to be depressed by the cam edge 7 of the pivotable plate 3 during a subsequent movement of the drive plate 16 in the direction H. It is to be noted that, at the time the plate 12 is rotated, the pivotable plate 3 has already been rotated through the predetermined angle with the cam edge 7 positioned away from the switch button 21 and, therefore, the switch button 21 cannot be depressed.

The return travel of the drive plate 16 is completed when the geared wheel 27 completes its rotation about the shaft 26. At this time, the pin 36 engaged in the groove 35 returns to its original position after having travelled along the groove 35 in accordance with the rotation of the geared wheel 27. It is to be noted that, upon completion of one rotation of the geared wheel 27, the toothless portion or notch 28 on the periphery of the geared wheel 27 registers with the geared portion of the hollow stud 23 and, therefore, further rotation of the hollow stud 23 and hence the turntable does not accompany the corresponding rotation of the geared wheel 27.

Figure 9:
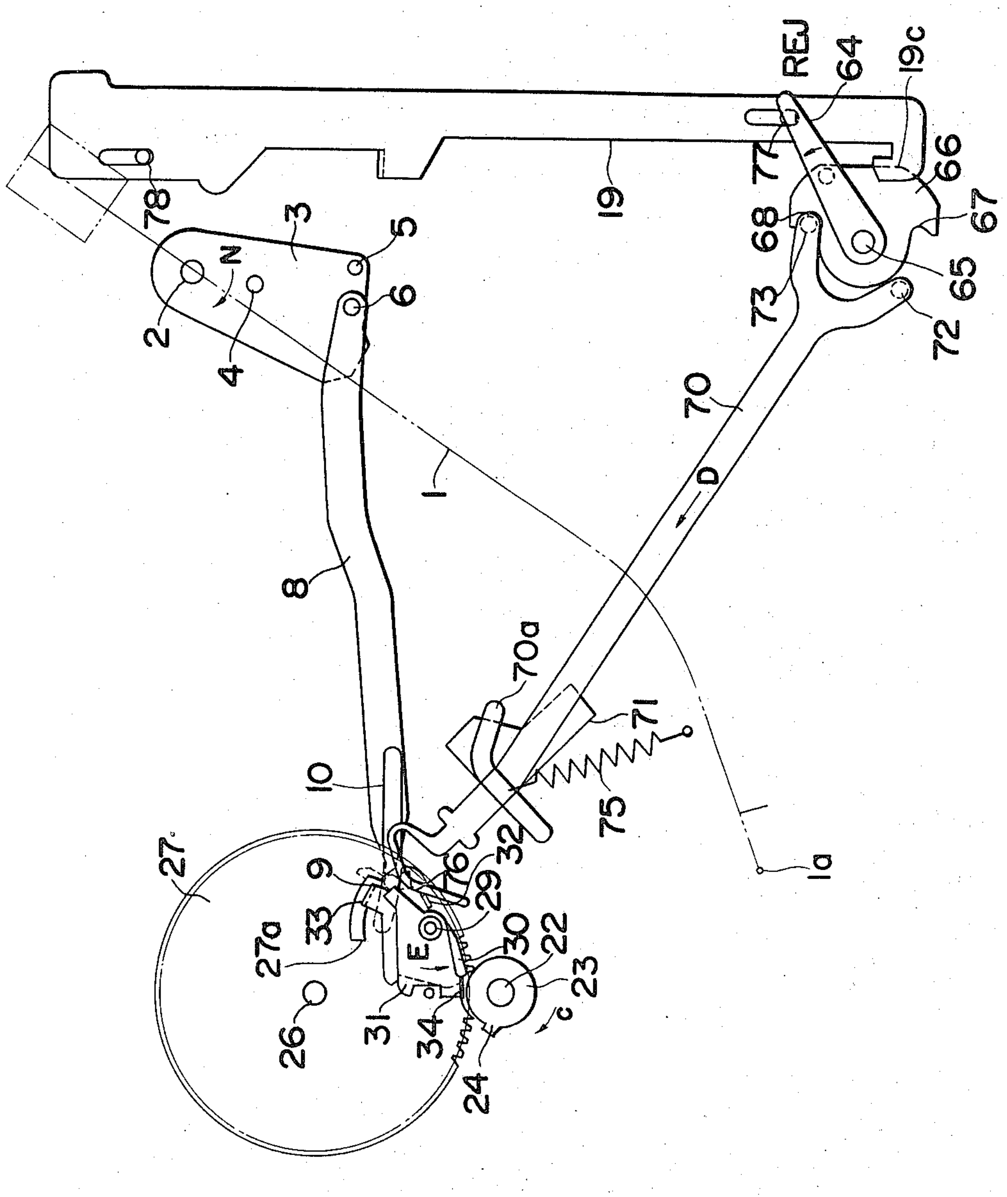

Thereafter, the record is played by means of the tone arm 1 angularly moving toward the shaft 26 about the spindle 2. Upon completion of the performance and as the pickup stylus 1a enters the lead-out groove of the record that has been already played out, the T-shaped actuator piece 9 on the movable actuator lever 8 which movement is accompanied by the angular rotation of the pivotable plate kicks the bent piece 33 of the actuating plate 30, causing the latter to rotate in the direction E as shown in FIG. 9. Rotation of the actuating plate 30 in the direction E frictionally accompanies the corresponding rotation of the operating member 31 and, therefore, the projecting piece 34 of the operating member 31 can be brought into the path of travel of the lateral projection 24 of the hollow stud 23 in a similar manner as is effected by operating the triggering knob 64 as hereinbefore described. Accordingly, it is clear that the drive plate 16 can be again moved in the direction H in substantially same manner as effected prior to the performance of the record.

Reciprocal movement of the drive plate 16 thus effected after the record has been played is associated with return of the tone arm 1 to the resting position from the play-out position.

More particularly, during movement of the drive plate 16 in the direction H, the lifting rod 47 is elevated with its lower end sliding over the cam member 44 on the drive plate 16, and, subsequently, the drive plate 16 pushes the return pin 4 on the pivotable plate 3 so as to cause the latter to rotate about the spindle 2 counter to the direction N whereby the tone arm 1 can be rotated to its resting position in the upwardly shifted condition. At this time, the switch mounting plate 12 is also rotated against the pulling action of the tension spring 14 by the pin 17 on the drive plate 16 sliding over the cam edge 15 of said plate 12 whereby the pivotable plate 3 can be rotated to its original position without the cam edge 7 of said pivotable plate 3 contacting the switch mounting plate 12. Therefore, even in this condition, the microswitch 13 is still in the closed position. It is to be noted that the arm 42*b* of the escapement wheel 42 will not engage the spindle 81*a* of the locking plate 80 since the slider 19 and the locking plate 80 retain their respectively original positions.

After the drive plate 16 has moved in the direction H and the tone arm 1 has been positioned above the tone arm rest, the drive plate 16 commences its return movement in the direction G. During this return movement of the drive plate 16, the lifting rod 47 descends with its lower end sliding down the cam member 44 and, therefore, the tone arm 1 is downwardly shifted to rest on the tone arm rest.

Simultaneously therewith, the pin 17 on the drive plate 16 slides down the cam edge 15 of the switch mounting plate 12 thereby permitting the switch button 21 to be depressed as the cam edge 7 of the pivotable plate engages therewith during the return rotation of the pivotable plate 3. Upon depression of the switch button 21 by the cam edge 7 of the pivotable plate 3, the microswitch 13 can be turned off to bring the motor M to an inoperative position. Immediately thereafter or simultaneously therewith, the pin 36 returns to the original position within the groove 35 by the action of the tension spring 40 urging the drive plate 16 in the direction G, in which condition the toothless portion or notch 28 of the geared wheel 27 registers with the geared portion of the hollow stud 23 and, therefore, no rotational force of the hollow stud 23 is transmitted to the geared wheel 27.

In the manner as hereinbefore described, the operation of the automatic record player embodying the present invention is completed with respect to a single record that had been played.

However, in the event that the performance of the record is to be intermitted prior to entry of the pickup stylus 1*a* in the lead-out groove of the record, it is necessary to rotate the triggering knob 64 to the REJ position. In this case, the curved finger 76 kicks the upright projection 32 of the actuating plate 30 and, therefore, it is clear that the same operation as hereinbefore described in connection with the return of the tone arm 1 to the resting position takes place.

The operation of the record size setting unit will now be described in association with the 17cm. diameter record and the 25cm. diameter record with reference to FIGS. 12 and 13, respectively.

If the selector knob 53 is rotated to the 17cm position which designate the particular diameter of the record to be played, the cam plate 55 is correspondingly rotated with the boss 57 moving within the W-shaped slot 55a from the intermediate portion to the right-hand portion and, hence, the positioning lever 56 moves in the direction as shown in FIG. 12. Accordingly, the projection 60 on the positioning lever 56 which is extended through the arcuate slot 61 defines the angle of rotation of the positioning plate 59 such that the stepped edge *f* of the positioning plate 59 engages the start pin 5 on the pivotable plate 3 as shown in FIG. 13.

On the other hand, if the selector knob 53 is rotated to the 25cm position the boss 57 on the positioning lever 56 can be similarly moved to the left-hand portion of the slot 55*a* of the cam plate 55. Accordingly, the projection 60 defines the angle of rotation of the positioning plate 59 such that the stepped edge *g* of said positioning plate 59 engages the start pin 5 on the pivotable plate 3.

While the automatic record player is constructed as hereinbefore described, it is clear that the record player can be used as a semi-automatic one. In other words, if the tone arm 1 is manually operated without the triggering knob 64 rotated to the START position, the rotation of the pivotable plate 3 permits its cam edge 7 to pass through the depressed switch button 21 whereby said switch button 21 can be outwardly projected to turn the microswitch 13 on to start the motor M. The return of the tone arm 1 to the rest position after the tone arm 1 has been placed over the record to be played can be automatically effected in the manner as hereinbefore described.

From the foregoing description of the present invention, in addition to the various advantages described above, additional advantages are apparent. In other words, because of the particular configuration of the substantially W-shaped slot 55*a* formed in the cam plate 55 of the record size setting unit, the detent positions of the record size selector knob 53 can be arranged in such a way that the 17cm position and the 25cm positions are respectively located on both sides of the 30cm position. This is particularly advantageous in that, in view of the fact that 30cm. diameter records are sold in greater number than the records of 25cm. and 17cm. diameters and, hence, the 30cm position is more frequently used than the other positions, switching of the selector knob 53 either to the 25cm position or to the 17cm position can be easily performed when a record of 25cm. or 17cm. diameter is desired to be played.

Furthermore, in view of the fact that the adjustment device is provided in the lifting rod for adjusting the lifting height of the tone arm, which includes the compression spring substantially interposed between said lifting rod and the tone arm, not only can fine adjustment of the lifting height be accomplished, but also a load downwardly acting on the tone arm can be absorbed by the compression spring. According to conventional adjustment devices of a similar character, the fine adjustment of the lifting height cannot be carried out without difficulty. This is because the conventional adjustment device comprises a lifting rod and a cylindrical cap member having one end slidably mounted on the lifting rod and the other end connected with the tone arm and provided with an adjustment screw extending through the cylindrical cap member perpendicularily of the longitudinal axis of the cylindrical cap member whereby the adjustment is carried out in such a manner that, while one holds the cylindrical cap member at a proper position, the adjustment screw is fastened to fix the cylindrical cap member. This is not only a time-consuming procedure, but also the fine adjustment of the lifting height is substantially impossible.

Although the present invention has been fully disclosed in conjunction with the preferred embodiment thereof, it is to be noted that various changes and modifications are apparent to those skilled in the art. Therefore, unless such changes and modifications depart from the scope of the present invention, they should be construed as included within the scope of the present invention.

What is claimed is:

1. In an automatic record player including a turntable the combination comprising: a tone arm capable of moving between a resting position, a ready position and a play position; a turntable drive system operatively positioned and including an electrical motor for rotating said turntable in one predetermined direction when said motor is operated; a switching knob manually movable to either of start and rejection positions; an electrical switch electrically connected between a suitable power source and said motor; a pivotable plate coupled to said tone arm and having a pin; a reciprocatively movable drive plate formed with a cam member; transmission means coupled to said turntable to transmit the rotation of said turntable to said drive plate for causing said drive plate to move in one direction during a first half cycle of operation of said transmission means and to move counter to said one direction of driveplate motion during the remaining half cycle of operation of said transmission means and operatively coupled to said switching knob for operation when said knob is moved to any one of said start and rejection positions; a lifting rod having a lower end slidably engaged with said cam member and capable of reciprocal motion in a vertical plane and an upper end thereof adapted to support said tone arm and operable in such a manner that, when said drive plate is moved in said one direction thereof, said lifting rod is thereby elevated and consequently raises said tone arm which is resting thereon in its rest position and, when said drive plate is moved counter to said one direction thereof said lifting rod is lowered and therefore lowers said tone arm; escapement means operably positioned to engage, during one operation of said transmission means as said drive plate moves in said one direction, said pin of said pivotable plate and to bring, as said drive plate moves counter to said one direction of motion of said drive plate, said tone arm away from its resting position to the predetermined ready position which is immediately above the lead-in groove of a record mounted on said turntable thereby permitting the record to be played, said tone arm being returned to the resting position after the record is played by said drive plate while said drive plate is moved in its one direction during a subsequent operation of said transmission means and engaged with said second pin of said pivotable plate; a slider normally urged in one direction and movable counter to the one direction normally urged when said switching knob is moved to the start position, thus causing said escapement means to engage said pin of said pivotable plate, said slider being operatively associated with said switching knob; means connecting said switching knob and said transmission means whereby, when said switching knob is moved to either said start position or to said rejection position, said transmission means is operated to transmit the rotation of said turntable to said drive plate; means connecting said pivotable plate and said transmission means whereby when said tone arm arrives at the lead-out groove of the record said transmission means is operated to transmit the rotation of said turntable to said drive plate; and means operatively located for locking said slider in a position in which condition said escapement means is able to engage said pin of said pivotable plate.

2. An automatic record player as claimed in claim 1 wherein said slider locking means comprises a spindle, said spindle adapted to engage said escapement means as said escapement means approaches thereto, pursuant to the movement of said drive plate in said one direction thereof during said one operation of said transmission means, whereby said slider can return to said normally urged position in one direction.

3. An automatic record player as claimed in claim 1 wherein said pivotable plate is further provided with a cam edge for operating said switch, said automatic record player further comprising a switch mounting plate rigidly mounted adjacent said switch and normally urged in one direction such that said switch is turned off and being movable counter to said one normally urged direction in response to the movement of said slider whereby said switch may be turned on, said switch being also capable of being turned on as said pivotable plate is moved to disengage said cam edge from said switch irrespective of the movement of said slider.

4. An automatic record player as claimed in claim 1, wherein said lifting rod includes an adjustment device for adjusting the lifting height of the tone arm, said adjustment device comprising said lifting rod having a blind hole formed in the upper end of said rod in alignment with the longitudinal axis of said rod, a compression spring, a lifting piece positioned in said blind hole with said spring sandwiched between said lifting piece and the base of said blind hole and a cylindrical cap member threadably mounted on the upper end of said lifting rod with an upper free end of said lifting piece slidably extending through said cap member whereby, the lifting height of the tone arm can be adjusted by turning said cap member in either direction.

5. An automatic record player as claimed in claim 1, wherein said transmission means comprises a hollow stud rotationally positioned relative to said turntable and having a lateral projection and a geared portion; a geared wheel located adjacent said stud and having a toothless portion on its periphery and having a cam groove, a boss rigidly mounted on said drive plate being slidably engaged therein and means on said gear wheel to engage said lateral projection, as said lateral projection approaches said means, said geared wheel being rotated counter to the direction of rotation of said hollow stud as said means engageable with said lateral projection engages therewith, said means engageable with said lateral projection being operatively associated with said means connecting said pivotable plate and said transmission means and also with said means connecting said switching knob and said transmission means.

6. An automatic record player as claimed in claim 5, wherein said cam groove is substantially heart shaped and formed with a substantially W-shaped portion forming a hill along which said boss slides immediately upon rotation of said geared wheel to reduce a resistance on said hollow stud through said means engageable with said lateral projection.

7. An automatic record player as claimed in claim 5, wherein said geared wheel has gear teeth adapted to engage said geared portion of said hollow stud, each of at least two of said teeth on said geared wheel adjacent to said toothless portion thereof having one of the opposed tooth surfaces which faces in the direction counter to the rotational direction of said geared wheel be flat, whereby engagement between said gear teeth of said geared wheel and said geared portion of said hollow stud immediately upon transmission of the turntable rotation to said geared wheel through said means engageable with said lateral projection can be smoothly performed with ready disengagement of said means engageable with said lateral projection from said lateral projection.

8. An automatic record player including a turntable comprising in combination a tone arm having a resting position, a play position and a ready position; a turntable drive system including an electrical motor for rotating said turntable in one predetermined direction when said motor is operated; a switch knob manually movable to either of said start and rejection positions; an electrical switch electrically connected between a suitable power source and said motor, said switch being closed to operate said motor only when said switching knob is moved to said start position; a pivotable plate rotatable together with said tone arm and having first and second pins; a reciprocatively movable drive plate formed with a cam member; transmission means operatively positioned to transmit rotation of said turntable to said drive plate causing said drive plate to move in one direction during a first half cycle of operation of said transmission means and to move counter to said one direction during the remaining half cycle of operation of said transmission means when said switching knob is operated to any one of said start and rejection positions; a lifting rod having a lower end slidably engaged with said cam member and an upper end adapted to support said tone arm and operable in such a manner that, when said drive plate is moved in said one direction, said lifting rod is raised thereby and upwardly shifts said tone arm which is resting thereon and, when said drive plate is moved counter to said one direction, said lifting rod is thereby lowered and said tone arm is moved downwardly; a record size selector knob manually movable among first, second and third detent stop positions which are respectively associated with records having diameters of 17 cm., 25 cm., and 30 cm.; a positioning plate having stepped edges corresponding in number to the number of said detent stop positions and associated therewith; means connecting said record size selector knob and said positioning plate; escapement means operatively positioned to engage said first pin of said pivotable plate during one operation of said transmission means as said drive plate moves in said one direction, and to bring said tone arm away from the resting position to the predetermined ready position immediately above the lead-in groove of a record mounted on said turntable as said drive plate moves counter to said one direction, thereby permitting the record to be thereafter played, said predetermined ready position being defined by engagement of said second pin and a selected one of said stepped edges selected by operating said selector knob to the corresponding one of said detent stop positions, said tone arm after having played said record being brought back to the resting position by said drive plate while said drive plate is moved in said one direction of movement of said drive plate during a subsequent operation of said transmission means and engaged with said second pin of said pivotable plate; a slider normally urged in a first direction when said switching knob is operated to the start position thereof causing said escapement means to engage said first pin of said pivotable plate, said slider being operatively associated with said switching knob; means connecting said switching knob and said transmission means whereby, when said switching knob is moved either to said start position or to said rejection position, said transmission means is operated to transmit the rotation of said turntable to said drive plate; means connecting said pivotable plate and said transmission means whereby when said tone arm arrives at the leadout groove of the record to be played, said transmission means is operated to transmit the rotation of said turntable to said drive plate; and means operatively positioned for locking said slider in a position wherein said escapement means engages said first pin of said pivotable plate, said locking means being provided with a spindle adapted to engage said escapement means when said escapement means approaches thereto pursuant to the movement of said drive plate in said one direction thereof during said one operation of said transmission means, thereby permitting said slider to return to the normally urged position in said first direction.

9. An automatic record player as claimed in claim 8, wherein said first and second detent positions of said record size selector knob are arranged on both sides of said third detent stop position.

10. An automatic record player as claimed in claim 8 wherein said switch is a microswitch having a switch button and said pivotable plate is further provided with a cam edge adapted to engage said switch button, said automatic record player further comprising a switch mounting plate rigidly mounted with said microswitch and normally urged in one direction such that said switch button is depressed to open said microswitch and movable counter to said one direction in response to the movement of said slider permitting said switch button to outwardly project to close said microswitch, said switch button being also capable of outwardly projecting to close said microswitch as said pivotable plate is moved to disengage said cam edge from said switch button irrespective of the movement of said slider.

11. An automatic record player including a turntable comprising in combination a tone arm capable of moving from a rest position to a ready position to a play position; a turntable drive system including an electrical motor for rotating said turntable in one predetermined direction when said motor is operated; a switch knob manually movable to either of start and rejection positions; an electrical switch electrically connected between a suitable power source and said motor, said switch being closed to operate said motor when said switching knob is moved to said start position; a pivotable plate operatively coupled to said tone arm and having first and second pins; a drive plate reciprocatively movable in the substantially lenthwise direction thereof and formed with a cam member; transmission means operatively positioned to transmit rotation of said turntable to said drive plate for moving said drive plate in one direction during a first half cycle of operation of said transmission means and for moving said drive plate counter to said one direction during the remaining half cycle of operation of said transmission means when said switching knob is moved to any one of said start and rejection positions; a lifting rod having a lower end slidably engaged with said cam member and an upper end adapted to support said tone arm and operable such that when said drive plate is moved in said one direction, said lifting rod is thereby elevated and upwardly shifts said tone arm which is resting thereon and, when said drive plate is moved counter to said one direction thereof, said lifting rod is lowered thereby lowering said tone arm; a record size selector know manually movable among first, second and third detent stop positions which are respectively associated with records having diameters of 17cm., 25cm., and 30cm.; a positioning plate having stepped edges corresponding in number to the number of said detent stop positions and associated therewith; means connecting said record size selector knob and said positioning plate; escapement means operable to engage during one operation of said transmission means as said drive plate moves in said one direction thereof, said first pin of said pivotable plate and to bring, as said drive plate moves counter to said one direction, said tone arm away from the resting position to the predetermined ready position which is immediately above the lead in groove of a record mounted on said turntable thereby permitting the record to be played, said predetermined ready position being defined by engagement of said second pin with a selected one of said stepped edges selected by setting said selector knob to the corresponding one of said detent stop positions, said tone arm after playing said record being returned to the resting position by said drive plate while said drive plate is moved in said one direction of said drive plate during a subsequent operation of said transmission means and engaged with said second pin of said pivotable plate; a slider normally urged in a first direction and movable counter to said first direction of said slider, when said switching knob is operated to the start position, for causing said escapement means to engage said first pin of said pivotable plate, said slider being operatively associated with said switching knob; means connecting said switching knob and said transmission means whereby, when said switching knob is moved either to said start position or to said rejection position, said transmission means is operated to transmit the rotation of said turntable to said drive plate; means connecting said pivotable plate and said transmission means whereby when said tone arm arrives at the lead-out groove of the record to be played, said transmission means is operated to transmit the rotation of said turntable to said drive plate; means for locking said slider in a position in which condition said escapement means engages said first pin of said pivotable plate, said locking means being provided with a spindle adapted to engage said escapement means as said escapement means approaches thereto accompanied by the movement of said drive plate in said one direction thereof during said one operation of said transmission means, thereby permitting said slider to return to the normally urged position in the first direction; and means for reducing a shock which may otherwise be generated upon completion of a return movement of said slider.

12. An automatic record player as claimed in claim 11, wherein said slider has a substantially square-shaped opening adjacent to said locking means, said locking means further comprising a pivotable locking plate formed with said spindle and a detent portion adapted to engage a solid member formd in a framework, and wherein said shock reducing means is comprised of a release plate pivotably mounted on said slider and formed with a projection extending through said opening in said slider and adapted to engage a barrier formed in the framework, and a coil spring connecting said locking plate and said release plate whereby, as said slider is moved counter to said first direction thereof, said projection of said release plate engages said barrier to permit said coil spring to expand for causing said detent portion to engage said projection thereby maintaining said slider in said locked position and, upon engagement of said detent portion and said projection being released to permit said extended coil spring to reduce its pulling force so that said slider can be returned to its normally urged position with said projection in contact with said barrier, said contact of said projection with said barrier being released upon completion of the return travel of said slider.

* * * * *